(12) United States Patent
Arnold (10) Patent No.: US 7,414,855 B1
(45) Date of Patent: Aug. 19, 2008

(54) MODULAR PORTABLE COMMUNICATION DEVICE WITH INTERCHANGEABLE OUTER HOUSING ASSEMBLY

(75) Inventor: Thomas Arnold, Carlsbad, CA (US)

(73) Assignee: Kyocera Wireless Corp., San Diego, CA (US)

( * ) Notice: Subject to any disclaimer, the term of this patent is extended or adjusted under 35 U.S.C. 154(b) by 462 days.

(21) Appl. No.: 11/244,491

(22) Filed: Oct. 5, 2005

(51) Int. Cl.
*H05K 5/00* (2006.01)

(52) U.S. Cl. .................. 361/752; 361/755; 361/800

(58) Field of Classification Search ................ 361/752, 361/790, 797, 800, 755; 455/575, 550, 566; 379/419, 428, 434
See application file for complete search history.

(56) References Cited

U.S. PATENT DOCUMENTS

| | | | |
|---|---|---|---|
| 4,980,522 A * | 12/1990 | Murakami et al. | 200/5 A |
| 5,654,701 A * | 8/1997 | Liao et al. | 341/22 |
| 6,011,699 A * | 1/2000 | Murray et al. | 361/814 |
| 6,914,982 B2 * | 7/2005 | Toyoda et al. | 379/433.13 |
| 2002/0030103 A1 | 3/2002 | Wycherley et al. | |
| 2003/0119543 A1 | 6/2003 | Kfoury et al. | |
| 2003/0211834 A1 | 11/2003 | Wu et al. | |
| 2004/0132514 A1 | 7/2004 | Lee | |
| 2004/0204131 A1 | 10/2004 | Parker | |
| 2005/0059425 A1 | 3/2005 | Wang et al. | |
| 2005/0153753 A1 | 7/2005 | Cheng | |
| 2007/0182715 A1 * | 8/2007 | Fyke et al. | 345/169 |

* cited by examiner

*Primary Examiner*—Hung S Bui (57) ABSTRACT

A portable communication device has a modular inner chassis containing a main printed circuit board and an outer housing for releasable engagement over the inner chassis so as to substantially completely enclose and conceal the inner chassis. The outer housing has at least two parts. A first part of the outer housing contains a keypad and a separate keypad printed circuit board for connection with a keypad connector on the main printed circuit board when the housing is engaged over the inner chassis. The outer housing and inner chassis have releasable interengaging formations for releasably securing the first and second parts of the outer housing over the inner chassis.

21 Claims, 5 Drawing Sheets

MODULAR PORTABLE COMMUNICATION DEVICE WITH INTERCHANGEABLE OUTER HOUSING ASSEMBLY

FIELD OF THE INVENTION

The present invention relates generally to portable communication devices such as mobile or cellular phones, portable communicators, or other handheld two way communication devices, and is particularly concerned with an outer housing assembly for such devices.

BACKGROUND OF THE INVENTION

Portable communication devices such as cellular phones come in many shapes and designs, and with different surface ornamentation. There are various types of cellular phone, some with a fixed outer housing and some with relatively movable parts. Cellular phones commonly referred to as having a "candybar" configuration have a single rectangular outer housing, with the screen and keypad always exposed. Another configuration commonly referred to as having a "clamshell" or flip phone configuration has a base on which the keypad is provided and a hinged cover or "flip" for covering the keypad when the phone is not in use, with the earpiece and user display screen being provided in the flip and linked to a main printed circuit board in the base by a flex connector. A slide phone has a slide member which covers the keypad when not in use, leaving the user display screen exposed. The slide member slides down to reveal the keypad when the user wishes to make a call.

Candybar style portable phones have been provided with removable outer housing covers or face plates which are detachably secured to the body of the phone and which can be used to change the color or graphics on the phone housing. However, these still typically leave part of the body of the phone exposed and cannot entirely modify the external appearance of the phone or the keypad. The shape and dimensions of such covers are typically constrained by the shape and dimensions of the particular phone body to which they are to be secured. Thus, each new phone model requires a new set of removable covers which will work only with that phone model. There is currently no removable cover option for cell phones with housings having relatively movable parts, such as clamshell phones. This means that each new phone design must go through extensive design verification testing, even if the only changes are in outer housing shape or keypad design.

SUMMARY OF THE INVENTION

An improved portable communication device with a removable outer housing assembly is disclosed. According to one aspect of the present invention, a portable communication device is provided which comprises a modular inner chassis having a main printed circuit board (PCB) with a keypad connector, and an outer housing for releasable engagement over the inner chassis so as to substantially completely enclose the inner chassis, the outer housing having at least two parts, a first one of the housing parts containing a keypad and a keypad printed circuit board under the keypad having a main PCB connector connected to the keypad connector on the main PCB when the housing is engaged over the inner chassis, the outer housing and inner chassis having releasable interengaging formations for releasably securing the two parts of the housing over the inner chassis.

The releasable interengaging formations may be snap engaging formations and the housing parts may be designed for snap engagement over the inner chassis. Alternatively, the housing parts may be sleeves for slidable engagement over different parts of the inner chassis.

The interlocking arrangement is such that a substantially uniform reveal gap is maintained between the housing parts or covers when they are assembled over the inner chassis, while the inner chassis is fully enclosed and thus does not require any ornamentation.

The inner chassis may comprise a clamshell having a base and a lid hinged to the base, the main PCB being located in the base and the lid having a display screen. In one embodiment, the first part of the outer housing comprises a first sleeve for sliding engagement over the base, and the second part comprises a second sleeve for sliding engagement over the lid. A front wall of the first sleeve carries the keypad and the keypad PCB is mounted inside the sleeve under the front wall. The second sleeve has a front wall with a window for alignment with the display screen on the lid.

In another embodiment with a clamshell inner chassis, the first part of the outer housing comprises an inner cover and an outer cover for releasable snap engagement over the base, and the second part of the outer housing comprises an inner cover and outer cover for releasable snap engagement over the lid, with each inner cover facing inwardly when the clamshell is closed. In one example, one of the covers has one or more loop snap formations on each side edge, and the other cover and inner chassis have corresponding snap members on their outer side edges for snap engagement in the loop formations. Other snap engaging formations may be used in alternative embodiments.

The housing inner and outer covers may include portions for extending over the hinge when the housing is engaged over the inner chassis base and lid. The hinge mechanism may not be covered in all embodiments, and in some cases a recess or clearance for the hinge mechanism may be provided.

In the embodiments described above, the hinged inner chassis contains the main printed circuit board (PCB), receiver, loudspeaker, LCD display, battery, and device antenna assembly, as well as all the mechanical features for the hinge, battery support, LCD module support, and the like. The first part of the outer housing contains the keypad and the keypad printed circuit board (PCB), and the second part has a window for alignment with the display screen in the lid, but is otherwise purely cosmetic in nature. This means that the main PCB layout is done only once, while the separate keypad circuitry allows multiple keypad variations without affecting the main PCB. The antenna designs (main, GPS, and Bluetooth if provided) are also done only once. The PCB and antenna therefore only have to be tested once. The outer cosmetic housing parts can be designed and assembled after the inner chassis has been fully tested, and are easily user replaceable. Multiple housing, color, keypad, and lens designs could be marketed to customers, so that they can completely customize their communication device or devices.

The cosmetic outer design of a portable communication device such as a mobile phone, hand held personal communicator, cordless telephone or the like can be completely separate from the design of the electric circuitry, antennae, and the like. This means that the same basic modular inner chassis, fully tested, can be used for a large number of different outer housing designs. The main PCB layout only needs to be done once for many different exterior housing and keypad designs. This will considerably reduce the time and effort required in developing and qualifying new communication device designs where the only change is ornamental in nature. The snap or slide on outer cosmetic housing parts can be assembled last minute in a configuration factory, or could be made in various different colors, shapes, and with different surface ornamentation for user customization purposes.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DETAILED DESCRIPTION OF THE PREFERRED EMBODIMENTS

Figure 1:
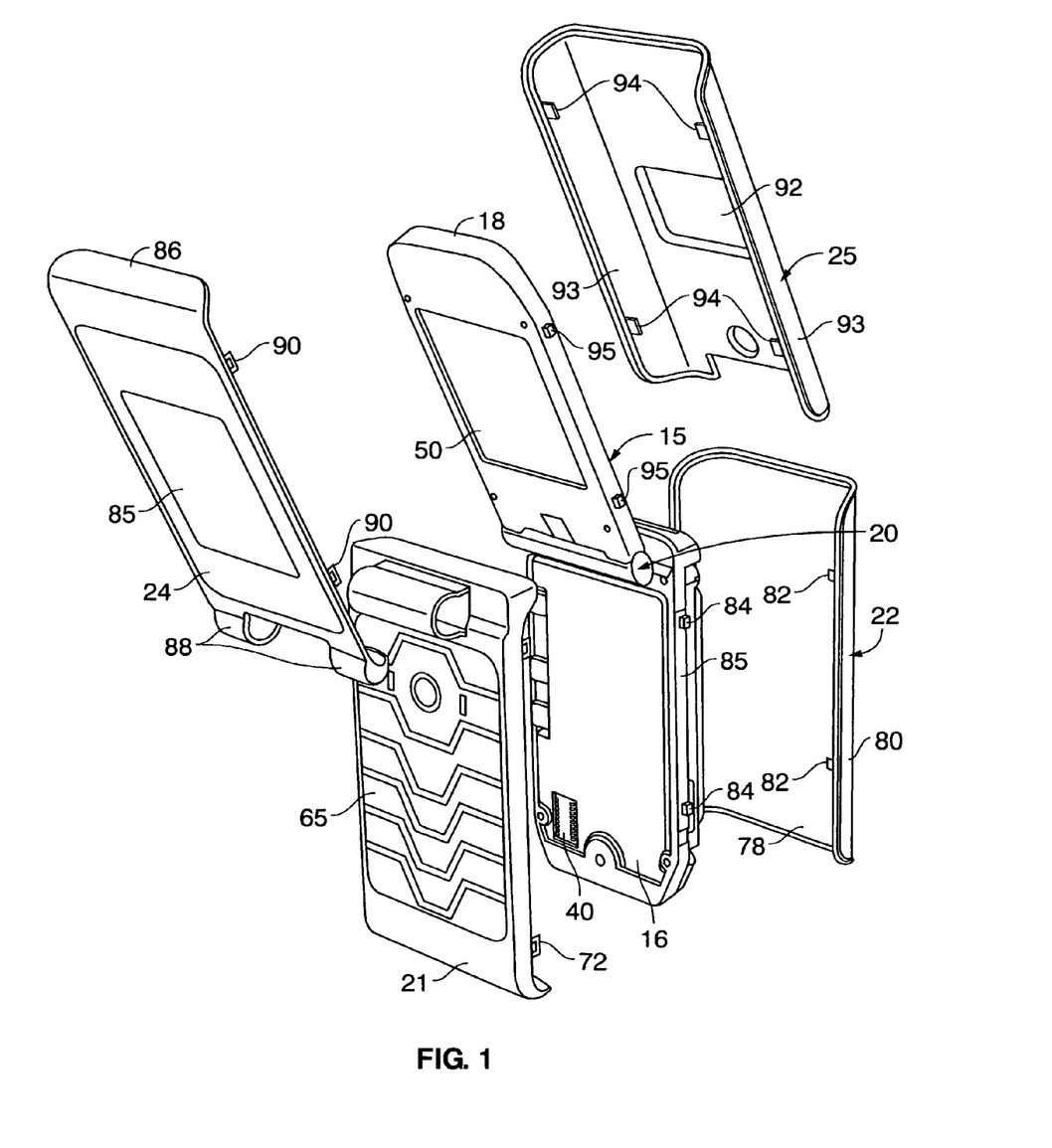
FIG. 1 is an exploded perspective view of a modular portable communication device according to a first embodiment of the invention, with the outer housing parts separated from the modular internal chassis.
Figure 2:
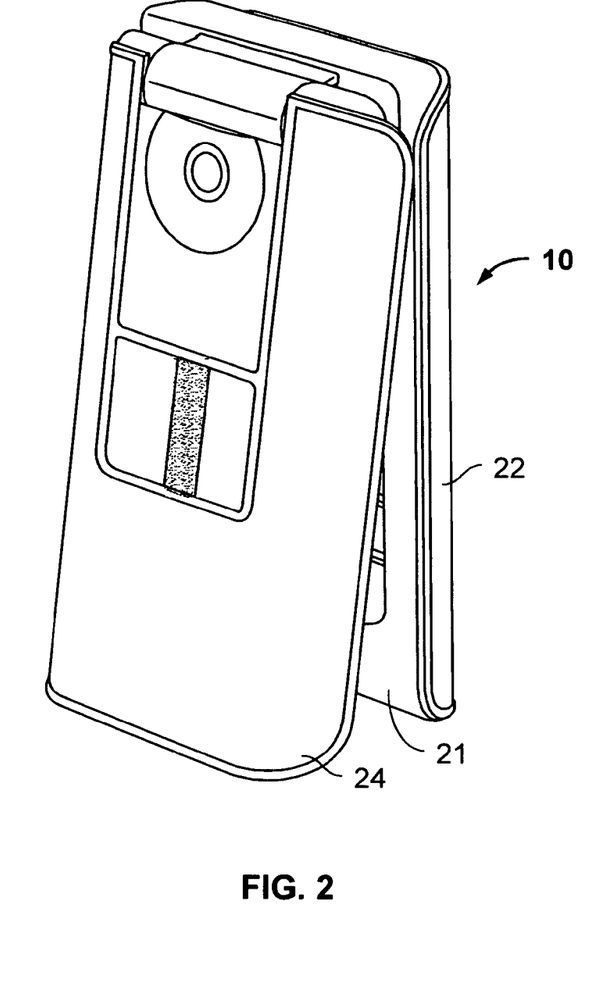
FIG. 2 is a perspective view of the portable communication device of FIG. 1 when fully assembled.

FIG. 2 of the drawings illustrates a fully assembled clamshell style mobile phone 10 with a base and flip or hinged lid according to a first embodiment of the invention, while FIG. 1 and FIGS. 3 to 6 show various components of the phone when in a separated condition. It will be understood that the same basic modular concept may alternatively be applied to other portable communication devices such as hand held computers, personal digital assistants, or cordless phones.

Typical clamshell or flip portable phones have a base containing a main printed circuit board, antenna and power supply, with a user control keypad on an inner face of the base which is exposed when the lid or flip is opened. The base is connected to the lid or flip at one end by a hinge mechanism. The lid has an LCD screen for display of information to the user, and also contains a receiver and loudspeaker for the phone. The modular portable phone of FIGS. 1 to 6 has all of these components but is designed in a modular manner with most of the electronics and mechanical features of the phone mounted in a modular inner chassis 15 with a removable outer housing which is mainly cosmetic in nature. This allows the look of the phone to be changed easily without having to re-design and test all of the phone components, as explained in more detail below.

Figure 3:
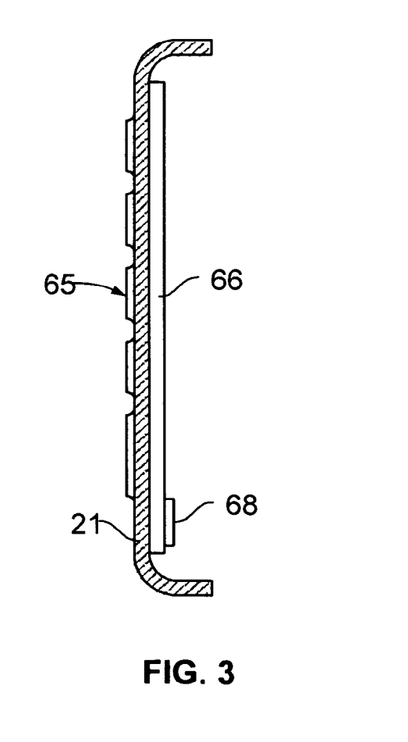
FIG. 3 is a cross-sectional view of the inner housing cover of the base.
Figure 4:
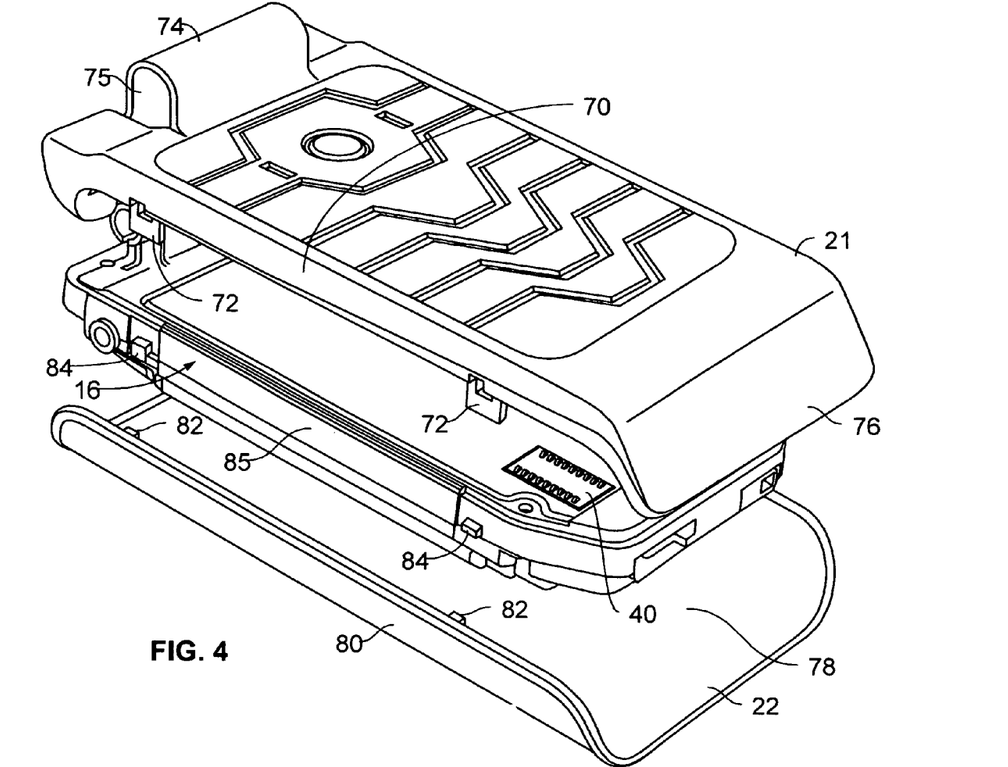
FIG. 4 is an exploded perspective view of the base of the device of FIGS. 1 and 2, illustrating the inner and outer covers separate from the base of the inner chassis and showing the interlocking snap formations for releasably securing the parts together.

As illustrated in FIG. 1, the modular inner chassis 15 of the phone 10 comprises a base 16 and a lid or flip 18 connected to the base by a hinge mechanism 20 which is of a conventional nature. The multi-part outer housing of the phone is best illustrated in FIGS. 1, 3 and 4. The housing comprises a first part for releasable engagement over the base 16 and a second part for releasable engagement over the lid 18. The first part of the outer housing comprises a separate inner and outer cover 21, 22 for engagement over the base. The second part of the housing also comprises a separate inner and outer cover 24, 25 for engagement over the lid. The base inner and outer covers are designed to snap together over the base 16 of the inner chassis 15, as illustrated in FIGS. 3 and 4, and the lid inner and outer covers snap together in an equivalent manner over the lid 18 of the inner chassis.

Figure 5:
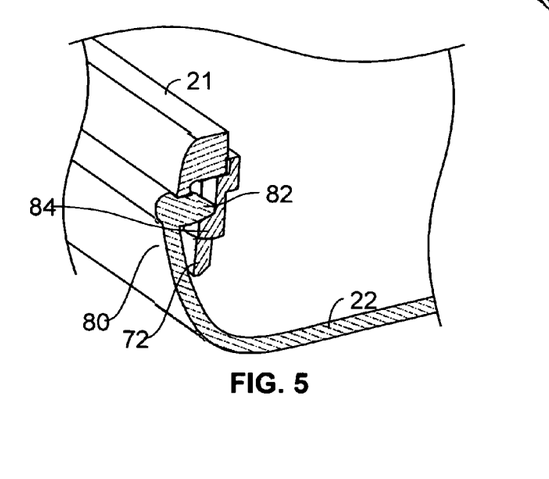
FIG. 5 is a cross-sectional view of one set of snap engaging formations when the inner and outer covers are fully engaged over the base.
Figure 6:
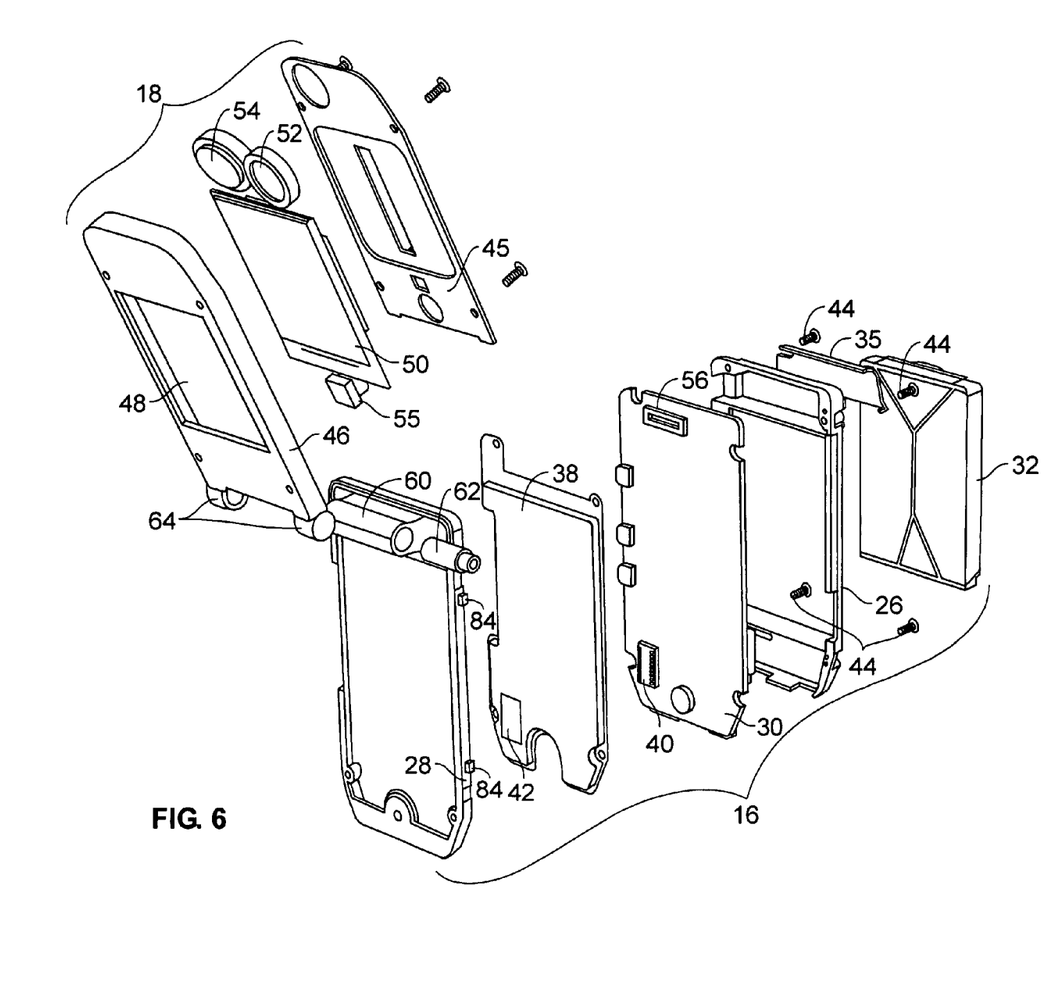
FIG. 6 is an exploded perspective view of the modular inner chassis of the device of FIG. 1, with the components separated.

The modular inner chassis 15 of the phone contains all of the electronics necessary to operate the phone apart from the keypad printed circuit board (PCB), as well as all the mechanical features of the phone apart from the keypad. The inner chassis 15 is illustrated in more detail in FIG. 5. As illustrated in FIG. 5, the base 16 comprises a housing having a separate rear frame 26 and front frame 28, with a main printed circuit board (PCB) 30 secured between the rear and front frames. A battery 32 is secured in the rear frame 26 by retaining tabs or the like. A main antenna 35 is secured in the rear frame in any suitable manner, and may be heat staked to the frame, for example. An MSM shield plate 38 is positioned over the electronic components on the main PCB. The main PCB has a keypad B2B connector 40 adjacent one corner, as indicated in FIG. 5, and the MSM shield plate 38 has an opening 42 aligned with connector 40. The housing frames, shield and main PCB are secured together by fastener screws 44 or a similar fastener mechanism.

The lid or flip 14 of the inner chassis comprises an outer housing or shroud 45, an inner housing 46 having a window 48, and an LCD display unit 50 secured between the inner and outer housing. A conventional receiver 52 and loudspeaker 54 are also located between the inner and outer housing of the lid. A flex connector 55 at the lower end of the display unit 50 is connected to a flex connector 56 on the main PCB via a suitable flex circuit or lead (not shown) when the parts are assembled together. The flex connection arrangement between the base and lid is similar to that used in conventional flip phones.

The front or inner frame 28 of the base has an integral pivot sleeve 60 in which a hinge pin 62 is rotatably mounted, and opposite ends of pin 62 are captured in hinge brackets 64 on the mating end of the flip or lid. This arrangement allows the lid 14 to pivot relative to the base between an open position as indicated in FIG. 1 and the closed position of FIG. 2.

Figure 7:
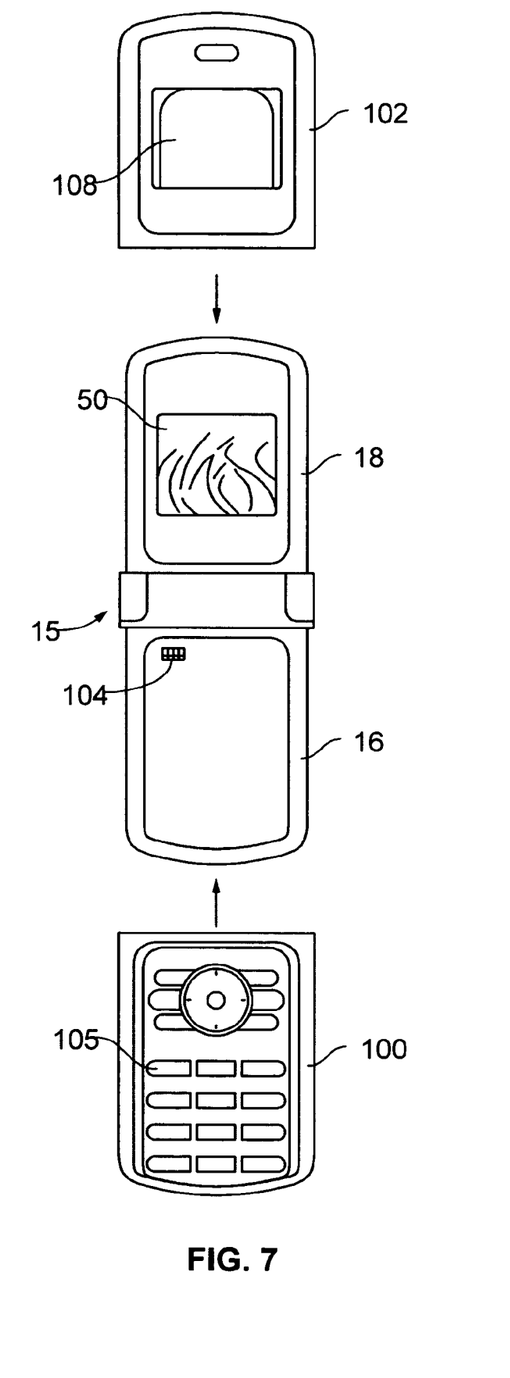
FIG. 7 is an exploded top plan view illustrating an alternative modular communication device of clamshell design with a slide-on outer housing arrangement.
Figure 8:
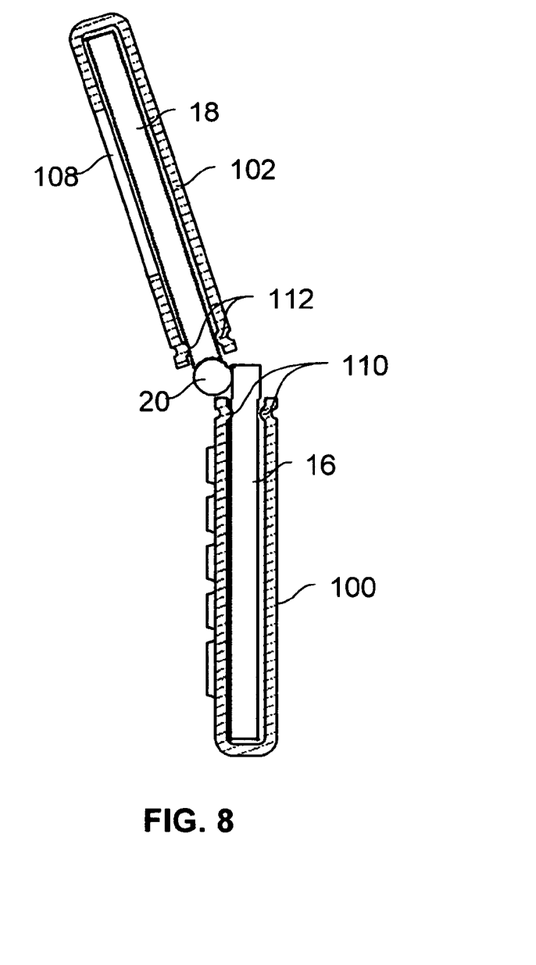
FIG. 8 is a cross sectional view of the embodiment of FIG. 7 with the two parts of the outer housing engaged over the base and lid of the inner clamshell chassis.

The outer cosmetic housing of the base and lid will now be described in more detail with reference to FIGS. 1 to 4. The inner and outer covers of the base and lid are designed for releasable snap engagement over the base and lid of the inner chassis 15. It will be understood that the snap engaging formations illustrated in FIGS. 4 and 5 may be modified in alternative embodiments. In another alternative arrangement, as illustrated in FIGS. 7 and 8, the outer housing parts may be designed for sliding engagement over the base and lid.

The inner cover 21 of the base has a keypad 65 on its front face with internal domes (not visible in the drawings). As illustrated in FIG. 3, keypad PCB 66 is secured in any suitable manner on the inside of the cover 21 for engagement with the keypad domes when the associated keys are depressed. Keypad PCB 66 has a connector 68 positioned for mating engagement with the keypad connector 40 on the main circuit board when the inner and outer covers are engaged over the base. Cover 21 has opposite side rims 70. Each side rim 70 has a pair of spaced, downwardly or inwardly directed snap formations or loops 72. A raised, part-cylindrical region 74 with opposite open ends 75 is formed on the upper end of the front face of cover 21, for engagement over the pivot sleeve 60 on the front frame 28 of the base. The lower end of the cover 21 has a downturned, generally rounded rim 76.

The base outer cover 22 (i.e. the side which faces outwardly when the housing parts are secured over the inner chassis and the flip phone is closed) has a generally flat outer wall 78 with downturned side rims 80. A pair of spaced hooks or snap members 82 project inwardly from the edge of each side rim. The snap members 82 are positioned for alignment with the snap loops 72 on the respective sides of the inner cover 21, as best seen in FIG. 4. The main frame 26 of the inner chassis base 16 has a pair of spaced anchors 84 on each side edge 85, also positioned in alignment with the snap loops 72 when the parts are secured together. In order to assemble the outer base housing over the base of the inner chassis, the covers 21 and 22 are positioned facing the front and rear faces of the base, respectively, and are urged together so that the snap hooks 82 engage in the respective snap loops 72 while the aligned anchors 84 snap engage in the snap loops 72 beneath hooks 82, as best illustrated in FIG. 5. The snap loops and associated hooks and anchors are of sufficient resilience to allow them to be snapped into and out of engagement as desired.

The snap engagement mechanism between the inner and outer covers uses the same anchor points on the base 16 so that both covers or housing parts snap onto the same anchor points. This minimizes the tolerance chain for the assembled parts, and also helps to maintain a consistent, uniform reveal gap between the inner and outer cover when engaged over the base. As can be seen in FIG. 5, the opposing side rims of the inner and outer covers are in abutment with each other when snap engaged over the base, completely covering and concealing the side edges of the base.

Similar releasable snap engaging formations are provided between the lid or flip 18 of the inner chassis and the inner and outer covers 24, 25 of the lid, as illustrated in FIG. 1. The lid inner cover 24 has a front face with a window 85 for alignment with the LCD screen 50 on the lid. The upper edge of the inner cover 24 has a rounded, downturned rim 86, and the lower edge has a pair of rounded, hook-like ears 88 for engaging over the hinge brackets on the lid. Opposite side edges of inner cover 24 each have a pair of spaced snap loops 90. The outer cover 25 has a generally flat outer or rear face having a window 92 for alignment with a conventional outer LCD display for displaying information to a user when the flip phone is closed. Side rims or flanges 93 extend downwardly from the opposite sides of the rear face of the outer cover 25. Inwardly directed, spaced snap hooks 94 are provided on the edges of the two side rims. The flip or lid inner housing or frame 46 has a pair of spaced anchors 95 on each side edge.

When the inner and outer covers 24, 25 are engaged over the lid, each snap loop 90 is aligned with a respective snap hook 94 and anchor 95 and the formations snap into releasable locking engagement as the parts are urged together, in exactly the same way as illustrated in FIG. 5 for the base housing covers. Again, the two covers of the outer housing engage common anchor points on the lid of the inner chassis, helping to maintain a consistent reveal gap.

It will be understood that the exact shape and dimensions of the snap engaging formations between the outer housing parts or covers and the inner chassis are by way of example only, and that other snap engaging formations may be used in alternative embodiments. For example, the loop snap may be provided on the inner chassis or outer cover rather than the inner cover, with snap engaging anchors or hooks on the outer covers engaging the loop. The loop may be replaced by a recess, groove, or hook. The outer housing parts or covers may snap together independent of the inner chassis in other embodiments, although it may be more difficult to maintain a constant reveal gap in this case.

Although the inner and outer covers of the housing in this embodiment are designed to completely enclose the inner chassis as well as the hinge connection between the base and lid, they may have recesses or indents for receiving the hinge in other embodiments, so that the hinge is not completely covered.

In the embodiment of FIGS. 1 to 6, the inner and outer covers of the housing are snap engaged over the inner chassis. FIGS. 7 and 8 illustrate an alternative in which the first and second parts of the outer housing comprise slide-on housing sleeves 100, 102 for engagement over the base 16 and lid 18 of the modular clamshell inner chassis. The only difference in the inner chassis in this embodiment is that the keypad PCB connector 40 of FIGS. 1 to 6 is replaced with a swipe connector 104. The base housing sleeve 100 has a keypad 105 of any desired design on its front face. A small keypad PCB (not illustrated) is mounted on the back side of the keypad 105, and has a swipe connector positioned for engagement with the main PCB swipe connector 104 when the sleeve 100 is engaged over the base as in FIG. 8. The base inner chassis and inner end of the sleeve 100 will be provided with any suitable latching or releasable snap formations 106 to releasably secure the base housing sleeve 100 on the base 16.

The lid housing sleeve 102 has a window or lens 108 on its front face for alignment with the display screen 50 on the lid 18 of the inner chassis. Similar latching or releasable snap formations 112 will be provided on the lid inner chassis and the inner end of the lid housing sleeve in order to releasably secure the lid housing sleeve 102 in place when it is slidably engaged over the lid, as in FIG. 8. The window or lens 108 and the surrounding frame 109 may be an interchangeable snap-in part, to provide different color and graphics options in the same outer sleeve 102. Similarly, the keypad 105 may be interchangeably mounted in the base sleeve 100.

The replaceable, slide-on housing sleeves 100, 102 provide a virtually endless possible selection of color, material, graphics, and keypad options, without any change in the inner chassis which contains all of the electronics, apart from the keypad PCB, as well as the mechanical components of the communication device.

The removable outer sleeves or two-part, snap-on covers of the base and lid in the above embodiments of the invention allow the cosmetic outer design of a portable communication device to be completely modified quickly and easily, simply by snapping or sliding the existing covers or sleeves off and replacing them with a new set of covers or sleeves having the same mechanical formations for engagement with the inner chassis, but which are otherwise of different design. The communication device may be a mobile phone, hand held personal communicator, cordless telephone or the like. Among other advantages, the cosmetic outer design of a portable communication device, including the keypad design, can be completely separate from the design of the electric circuitry, antennae, and the like. As such, the same basic modular inner chassis, fully tested, can be used for a large number of different outer housing designs. This will considerably reduce the time and effort required in developing and qualifying new communication device designs where the only change is ornamental in nature.

Advantageously, the appearance of their portable communication device can be customized to a much greater extent than was possible in the past. Multiple housing, color, keypad and window lens designs could be marketed and sold to customers, with a potential increase in profits for each inner chassis model. Manufacturers can also readily change the external appearance of a portable communication device without having to re-design and test the entire device. The same outer housings could be used with different inner chassis models, increasing versatility and interchangeability.

Unlike prior art portable communication devices which have an outer casing with a detachable portion to allow for changing at least part of the external appearance of a such a device, the modular device according to certain embodiments of the present invention allows the entire external appearance to be modified. In other words, the removable outer housing covers and conceals substantially the entire inner chassis. The inner chassis contains all of the electronics apart from the keypad as well as most of the mechanical elements of the device. Although some exemplary embodiments of the invention have been described above by way of example only, it will be understood by those skilled in the field that modifications may be made to the disclosed embodiments without departing from the scope of the invention, which is defined by the appended claims.

What is claimed is:

1. A portable communication device, comprising:
   a modular inner chassis having a base and a lid, wherein the base of the inner chassis includes a main printed circuit board, the main printed circuit board having a keypad connector;
   a first outer housing for releasable engagement over the base of the inner chassis in a closed condition so as to substantially completely enclose the base of the inner chassis, the first outer housing including a keypad and a separate keypad printed circuit board with a main circuit board connector for connection with the keypad connector on the main printed circuit board when the housing is engaged over the inner chassis;
   a second outer housing for realeasable engagement over the lid of the inner chassis such that a window on the second outer housing part is aligned with a display screen on the lid of the inner chassis and the second outer housing part substantially completely covers and encloses the lid of the inner chassis; and
   the outer housing having releasable interengaging formations for releasably securing the first and second parts of the outer housing over the inner chassis.

2. The device as claimed in claim 1, wherein the inner chassis has releasable interengaging formations for releasable engagement with the interengaging formations on the outer housing.

3. The device as claimed in claim 2, wherein the interengaging formations on the inner chassis and housing are snap engaging formations for releasable snap engagement when the housing is secured over the chassis.

4. The device as claimed in claim 1, wherein the inner chassis has a hinge pivotally connecting the lid to the base for movement between an open position in which the lid is pivoted away from the base and a closed position in which the lid is pivoted over the base.

5. The device as claimed in claim 4, wherein the first part and second part each comprise a sleeve for slidable engagement over the base and lid, respectively.

6. The device as claimed in claim 4, wherein the base and lid each have an inner face which faces inwardly when the base and lid are in the closed position and an outer face which faces outwardly in the closed position, the first part of the outer housing comprising a base inner cover and a base outer cover for releasable engagement over the base, and the second part of the outer housing comprising a lid inner cover and a lid outer cover for releasable engagement over the lid.

7. The device as claimed in claim 6, wherein said interengaging formations comprise snap engaging formations.

8. The device as claimed in claim 7, wherein the base has opposite edges each having at least one anchor, and the base inner and outer covers have opposite edges each having a snap member for snap engagement with the respective anchor on the corresponding edge of the base, the anchor and snap members comprising said snap engaging formations.

9. The device as claimed in claim 8, wherein the lid has opposite edges each having at least one anchor, and the lid inner and outer covers have opposite edges each having a snap member for snap engagement with the respective anchor on the corresponding edge of the lid, the anchor and snap members comprising said snap engaging formations.

10. The device as claimed in claim 6, wherein the base and lid inner and outer covers each comprise a generally rectangular member with an outer face, opposite side rims depending inwardly from said outer face, and opposite ends, the respective adjacent side rims of each inner and outer cover being in abutment along the entire length of the side rims when the inner and outer covers are engaged over the base and lid, respectively, whereby there is substantially no gap between the abutting side rims of the covers enclosing the base and lid.

11. The device as claimed in claim 4, wherein the first and second parts of the outer housing substantially cover the hinge of the inner chassis.

12. The device as claimed in claim 1, wherein the inner chassis contains all the electronic and mechanical features of the portable electronic device apart from the keypad and keypad printed circuit board.

13. A portable communication device, comprising:
    an inner chassis having a base with a first surface and a second surface, a lid, and a hinge connection between the base and lid for allowing the lid to be flipped between an open position pivoted away from the first surface and a closed position extending over at least part of the first surface;
    a first housing part for releasable engagement over the base, the first housing part having a keypad for extending over at least part of said first surface of the base, the first housing part comprising a first sleeve for slidable engagement over the base;
    the base containing a main printed circuit board (PCB) for communication with said keypad when said first housing part is engaged over said base; and
    a second housing part for releasable engagement over the lid, the second housing part comprising a second sleeve for slidable engagement over the lid.

14. The device as claimed in claim 13, further comprising a keypad printed circuit board (PCB) mounted in said first housing part beneath said keypad, said keypad PCB having a first connector and said main PCB having a second connector for connection with said first connector when said first housing part is engaged over said base.

15. The device as claimed in claim 13, wherein said lid has an inner surface having a display screen linked to said main PCB for displaying information to a user, and the second housing part has a window for alignment over said display screen when the second housing part is engaged over said lid.

16. The device as claimed in claim 13, wherein each outer housing part comprises separate inner and outer covers for releasable snap engagement over the base and lid, respectively.

17. The device as claimed in claim 16, wherein each inner and outer cover has an outer substantially flat face and opposite side edges, the opposite side edges each being bent away from said outer face and towards the respective side edge of the opposing cover, the opposite side edges of the inner and outer covers of each housing part being located adjacent one another with a substantially constant reveal gap when the inner and outer covers are secured together over the base and lid, respectively.

18. The device as claimed in claim 16, wherein the inner and outer covers of each housing part have snap engaging formations for releasable snap engagement when the covers are secured together.

19. The device as claimed in claim 18, wherein the base and lid each have snap engaging formations for releasable snap engagement with the snap engaging formations of the respective inner and outer cover, wherein the base inner and outer covers are releasably anchored to the base and the lid inner and outer covers are releasably anchored to the lid.

20. The device as claimed in claim 13, wherein the first and second housing parts cover substantially the entire exterior surface of the base and lid, respectively.

21. A method of securing a removable outer housing for a clamshell portable communication device, comprising the steps of:

releasably engaging a first outer housing part over a base of an inner chassis, wherein the first housing part includes such that a keypad printed circuit board;

connecting the keypad printed circuit board to a main printed circuit board in the base of the inner modular chassis and the first outer housing part substantially completely covers and encloses the base of the inner chassis;

releasably engaging a second outer housing part over a lid of the inner chassis such that a window on the second outer housing part is aligned with a display screen on the lid of the inner chassis and the second outer housing part substantially completely covers and encloses the lid of the inner chassis; and exchanging the first and second outer housing parts for different first and second outer housing parts of different design in order to change the external appearance of the portable communication device.

* * * * *